(12) United States Patent
Anteby et al.

(10) Patent No.: US 6,280,045 B1
(45) Date of Patent: Aug. 28, 2001

(54) LIGHTED FOOTWEAR MODULE WITH RANDOM TIME DELAY

(75) Inventors: Edward J. Anteby, Long Branch, NJ (US); Alan Israel, New City, NY (US)

(73) Assignee: E. S. Originals, Inc., New York, NY (US)

( * ) Notice: Subject to any disclaimer, the term of this patent is extended or adjusted under 35 U.S.C. 154(b) by 0 days.

(21) Appl. No.: 09/479,296

(22) Filed: Jan. 6, 2000

(51) Int. Cl.[7] ............................................. F21V 33/00
(52) U.S. Cl. ................. 362/103; 362/276; 362/800; 362/802; 36/137; 315/200 A
(58) Field of Search ................... 362/103, 800, 362/276, 802; 36/137; 315/200 A

(56) References Cited

U.S. PATENT DOCUMENTS

| | | | | |
|---|---|---|---|---|
| 4,848,009 | * | 7/1989 | Rodgers | 36/137 |
| 5,483,759 | * | 1/1996 | Silverman | 362/103 X |
| 5,663,614 | * | 9/1997 | Weng et al. | 315/360 |
| 5,969,479 | * | 10/1999 | Wong | 315/200 A |
| 6,012,822 | * | 1/2000 | Robinson | 362/103 |

\* cited by examiner

*Primary Examiner*—Stephen Husar
(74) *Attorney, Agent, or Firm*—Kirschstein et al.

(57) ABSTRACT

Lights on footwear are flashed after a random time delay generated when a motion-responsive switch on the footwear has been closed to create an unpredictable, eye-catching light display.

9 Claims, 1 Drawing Sheet

LIGHTED FOOTWEAR MODULE WITH RANDOM TIME DELAY

BACKGROUND OF THE INVENTION

1. Field of the Invention

The present invention generally relates to lighted footwear and, more particularly, to a lighting system that flashes a set of light sources after elapse of a random time delay generated in response to closure of a motion-responsive switch.

2. Description of the Related Art

Lighted footwear is popular with men, women and children for reasons of safety by rendering the wearers more visible at night, and for reasons of fashion. Such footwear typically includes at least one light source and preferably a plurality of light sources such as light emitting diodes, a source of power such as a battery, and a switch to connect the battery to the light sources to illuminate them.

The switch can be a simple manual switch as disclosed, for example, in U.S. Pat. No. 4,158,922. The switch could be a mercury switch in which a ball of mercury runs back and forth along a tube between a pair of electrical contacts during motion of the footwear, as disclosed in U.S. Pat. No. 4,848,009. The switch can be a pressure responsive switch which opens and closes in response to application of the wearer's weight on the switch as disclosed, for example, in U.S. Pat. No. 5,285,586. The switch can be a spring switch in which a cantilevered spring in the form of a coil oscillates back and forth to make and break contact with an electrical terminal as, for example, shown in U.S. Pat. No. 5,408,764. The switch may include a metal ball that moves when the footwear moves, as shown in U.S. Pat. No. 2,572,760, or U.S. Pat. No. 5,438,493, or U.S. Pat. No. 5,483,759.

To increase battery life and to provide a more attractive eye-catching and safer display, it is desirable to cause the lights to flash on and off, rather than being maintained continuously illuminated while the switch is closed. This can be accomplished mechanically by the back and forth movement of the above-described mercury or metal balls, or by the oscillation of the aforementioned coil spring, or by the intermittent application of weight in a pressure responsive switch.

Another way to cause flashing is electronically by use of an oscillator or flasher, preferably at low speeds on the order of a few Hertz, as for example described in U.S. Pat. No. 4,158,922. The switch is then used not to make intermittent contact, but instead, a switch closure is employed to trigger an electronic component such as an integrated circuit, such as described in U.S. Pat. No. 5,903,103, to initiate a flashing light sequence.

As advantageous as the known lighted footwear has been, experience has shown that improvements can still be made in their use. Thus, flashing sequences of known footwear are initiated immediately after a switch closure, or after a switch opening. The duration of these sequences is typically fixed. Although visually exciting at first, an immediate, predictable flashing sequence can become boring over time.

SUMMARY OF THE INVENTION

OBJECTS OF THE INVENTION

Accordingly, it is a general object of this invention to improve the state of the art of lighted footwear.

More particularly, it is an object of the present invention to provide a more visually stimulating, eye-catching display of lights.

FEATURES OF THE INVENTION

In keeping with the above objects and others which will become apparent hereafter, one feature of the present invention resides, briefly stated, in a lighting system for footwear, wherein a power source, such as a battery, and at least one light source, and preferably a plurality of light sources such as light emitting diodes, is mounted on the footwear. The system includes a motion-responsive switch for switching between open and closed states in response to motion of the footwear. For example, an electrically conductive rolling ball can be mounted in a housing to make or break electrical contact as the ball rolls in the housing.

In accordance with this invention, a delay circuit is mounted on the footwear for generating a random, unpredictable time delay when the motion-responsive switch has been switched to the closed state. A flashing circuit on the footwear is then operative for flashing the light sources after the random time delay has elapsed. Since the time delay is unpredictable in advance, the duration of the flashing sequence is likewise unknown in advance. This unpredictability in the onset and duration of the flashing sequence provides for a more visually stimulating light display as compared to known lighting systems in footwear.

In the preferred embodiment, the delay circuit includes a random number generator constantly powered by the battery for generating random numbers. A buffer connected to the number generator stores these random numbers. A control circuit connected to the buffer is operative for interrupting the storage of the random numbers when the motion-responsive switch is in the closed state. The control circuit includes a control switch, and a clock constantly powered by the battery for opening and closing the control switch to generate a control signal that is conducted to the buffer. The delay circuit further includes an astable multivibrator connected to the buffer for generating an actuation pulse whose duration is a function of the random number stored in the buffer when the control signal interrupted the storing of random numbers in the buffer.

In use, when the motion-responsive switch is closed, the light sources are maintained extinguished for a time delay whose duration is not known in advance since the duration depends on when the motion-responsive switch was closed and, in turn, the valve of the particular random number stored in the buffer at the time of the switch closure. After the elapse of the time delay, the flashing circuit causes the lights to flash for a time period after which the lights, once again, are extinguished.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
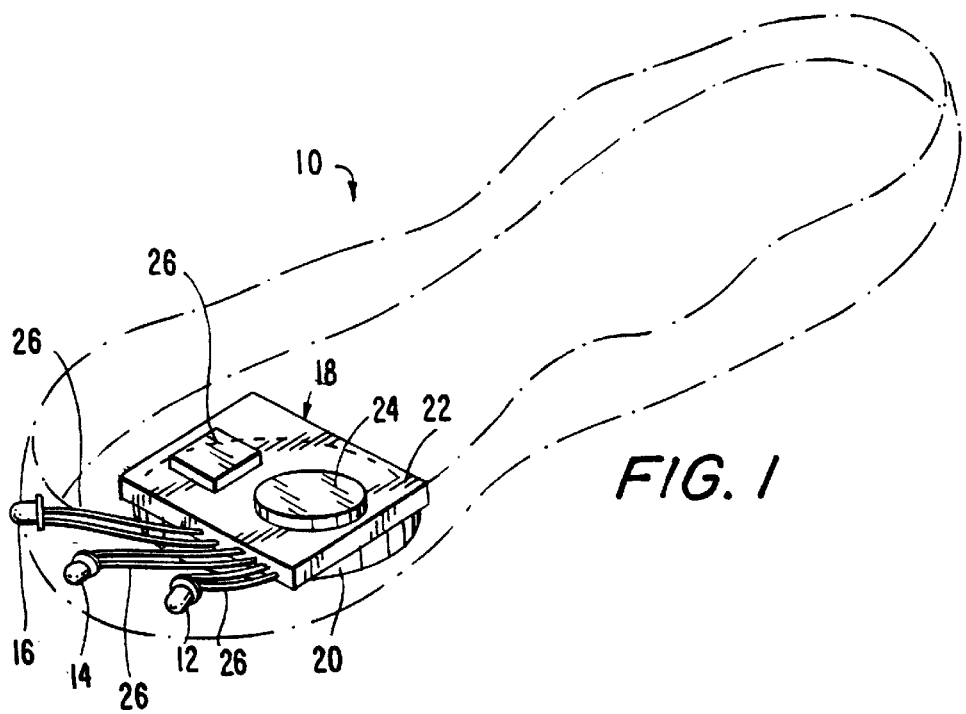
FIG. 1 is a perspective view of a sole of a shoe shown in phantom lines in which sole the lighting system of this invention is incorporated.

Referring now to FIG. 1, reference numeral 10 generally identifies a sole of a shoe, the sole being shown in phantom lines. The shoe can be an athletic, casual, or formal shoe, or it can be a boot or a sandal, or, in brief, any kind of footwear for men, women or children.

A lighting system is incorporated in the sole, and includes at least one light source and preferably a plurality of light sources, e.g., LEDs 12, 14, 16. Rather than light emitting diodes, incandescent, electroluminescent, infrared or ultraviolet light sources may be used. The sources are shown arranged around the periphery of the heel of the sole, but they can be arranged anywhere on the shoe, including the upper. More or fewer than three sources can be used.

The sources receive electrical current from a module 18 preferably embedded in the sole. The module contains a battery 20 typically a 3 volt lithium battery having the shape of a circular disk. The battery 20 is mounted on one side of a printed circuit board 22.

The module also contains an inertial switch 24 on the opposite side of the board 22, for controlling the lighting of the sources. Electrically conductive wires 26 extend from the sources to the module to conduct the electrical current from the battery as permitted by the switch 24. An inertial switch especially suitable is described in a concurrently filed U.S. patent application Ser. No. 09/479,297 entitled "Inertial Switch for Lighted Footwear", the entire contents of which are hereby incorporated by reference herein.

Figure 2:
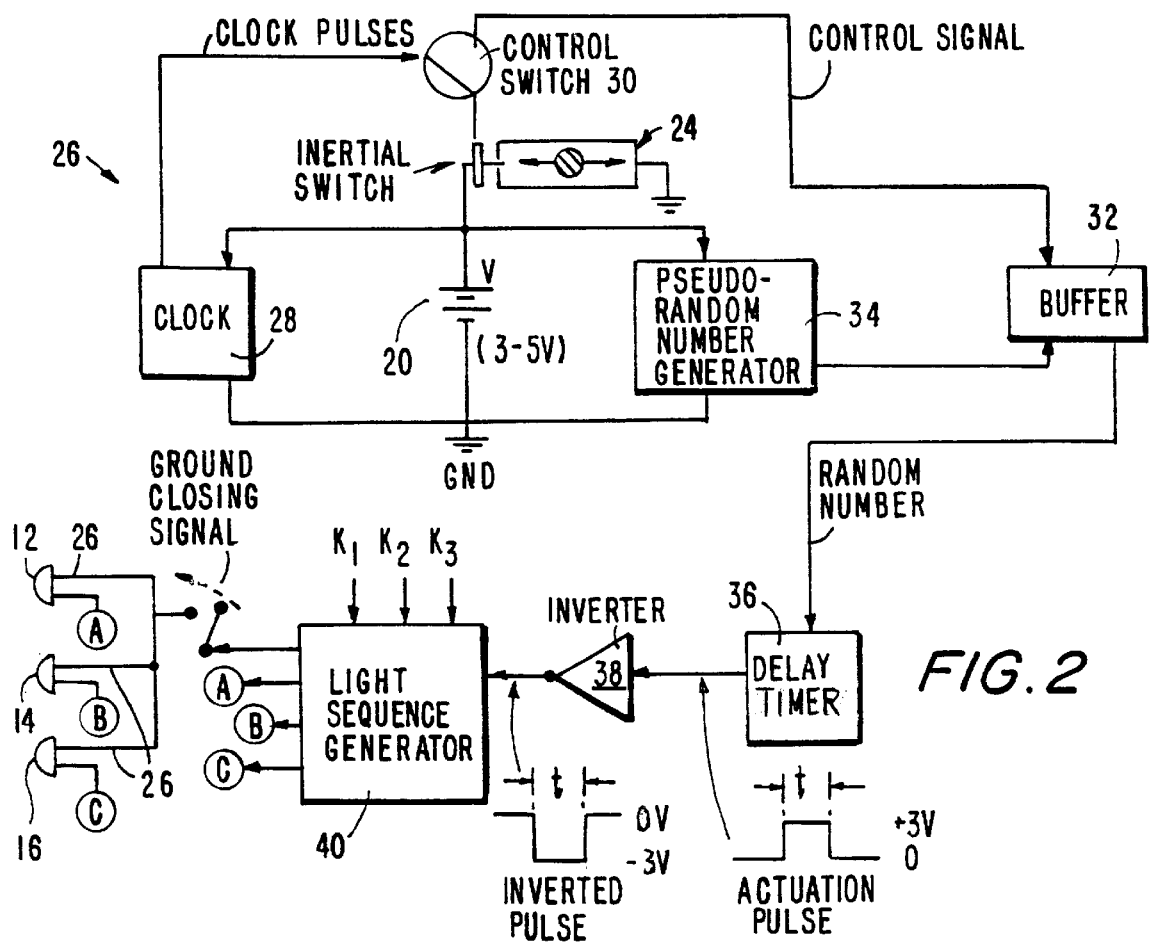
FIG. 2 is an electrical schematic of the lighting system in FIG. 1.

In accordance with this invention, an integrated circuit 26 is connected among the inertial switch 24, the battery 20 and the light sources 12, 14, 16. Their electrical connections have been omitted from FIG. 1 for the sole of clarity, but are shown in FIG. 2 in which a clock 28 is connected to the battery 20 and is constantly powered to continuously generate clock signals or pulses which are conducted to a semiconductor control switch 30 to repeatedly open and close the control switch 30 at a relative fast clock frequency which, in the preferred embodiment, is about 64 kHz. The inertial switch 24, the control switch 30 and the clock 28 together form a control circuit that generates an output control signal that has either a logic high state or a logic low state, and is conducted to a buffer 32, whose operation is explained below.

A random or pseudo-random number generator 34 is also connected to the battery 20 and is constantly powered to continuously generate random numbers, and to conduct these random numbers to the buffer 32 for storage therein. True random number generation is generally regarded as impossible but, for all practical purposes, the generator 34 produces an unpredictable sequence of numbers in which no number is any more likely to occur at a given time in the sequence than any other. The buffer thus is continuously being supplied with random numbers, each successive number replacing the preceding one. It is not known at any particular time which random number is currently being stored in the buffer.

The inertial switch 24 is a motion-responsive switch that alternates between open and closed states in response to motion of the footwear. For example, the switch 24 may comprise an electrically conductive metal ball rollable along a housing for making or breaking an electrical connection with an electrical terminal.

In operation, when either the inertial switch 24 or the control switch 30 is open, then the aforementioned control signal is not generated. The control signal is only generated when both the control switch 30 is closed as dictated by the clock, and when the inertial switch 24 is closed as dictated by the wearer's movement of the footwear. Upon generation of the control signal, the buffer 32 is instructed to dump its contents, i.e., the last stored random number, and to conduct this random number to a delay timer 36.

The delay timer 36 is preferably an astable multivibrator operative for generating an actuation pulse whose duration (t) is proportional to the random number conducted to the delay timer 36. The duration is, of course, different for each random number and is not known in advance.

In the preferred embodiment, the actuation pulse is fed to an inverter 38 for generating an inverted pulse that is conducted to a light sequence generator 40 that is, in turn, connected via the wires 26 to the light sources 12, 14, 16. The sequence generator 40 is operative for flashing the light sources, but only after the time delay has elapsed. The light sources have been extinguished during the entire time that the control switch 30 has been opening and closing, that the inertial switch has been opening and closing, that the number generator has been generating random numbers, and that the buffer has been storing the random numbers. The light sources remain extinguished for the entire random time delay after which the sequence generator 40 energizes the light sources.

The particular flashing sequence is set in advance by the factory by the selective closure of switches K1, K2 and K3, either alone or in combination. For example, switch K1 may enable all the lights to simultaneously flash on and off. Switch K2 may enable the lights to flash in succession in one direction, and then to flash in succession in the opposite direction. Switch K3 may enable the lights to flash at different rates. Any fixed or variable light flashing sequence is within the scope of this invention.

In the preferred embodiment, the sequence generator has power signal outputs A, B and C connected to one wire of each pair of wires 26 of the light sources 12, 14, 16. The other wire of each pair is commonly connected and is switched open and closed by a ground-closing signal that is output from the sequence generator.

In an alternate embodiment, the random number generator can be replaced by a free-running counter whose counting is interrupted by the control signal from the control circuit. Upon interruption, the last count, which is an unpredictable number since the time of interruption is not known in advance, is conducted to the delay timer to produce an actuation pulse whose duration, as before, is dependent on the value of the last count.

Hence, the opening or closing of the inertial switch does not immediately trigger the flashing of the light sources since the flashing only occurs after the random time delay has expired. This introduces an unpredictable quality to the flashing and creates a more interesting, visually stimulating light display as compared to known designs.

It will be understood that each of the elements described above, or two or more together, also may find a useful application in other types of constructions differing from the types described above.

While the invention has been illustrated and described as embodied in a lighted footwear module with random time delay, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

We claim:

1. A lighting system for footwear, comprising:
   a) a power source on the footwear for supplying electrical power to the system;
   b) a light source on the footwear for emitting light exteriorly of the footwear when powered by the power source;
   c) a motion-responsive switch on the footwear for switching between open and closed states in response to motion of the footwear;
   d) a delay circuit on the footwear for generating a random time delay when the motion-responsive switch has been switched to the closed state; and
   e) a flashing circuit on the footwear for flashing the light source after the random time delay has elapsed.

2. The lighting system of claim 1, wherein the power source is a battery.

3. The lighting system of claim 1, wherein the light source is a light emitting diode.

4. The lighting system of claim 1, wherein the motion-responsive switch includes a housing, a pair of electrical contacts, and an electrically conductive ball freely rollable in the housing for movement toward and away from the contacts.

5. The lighting system of claim 1, wherein the delay circuit includes a random number generator constantly powered by the power source for generating unpredictable numbers; a buffer connected to the number generator for storing the unpredictable numbers; and a control circuit connected to the buffer for interrupting the storing of the unpredictable numbers when the motion-responsive switch is in the closed state.

6. The lighting system of claim 5, wherein the control circuit includes a control switch, and a clock constantly powered by the power source for opening and closing the control switch to generate a control signal for conduction to the buffer.

7. The lighting system of claim 5, wherein the delay circuit includes an astable multivibrator connected to the buffer for generating an actuation pulse whose duration is a function of the unpredictable number stored in the buffer when interrupted by the control circuit.

8. The lighting system of claim 1; and further comprising additional light sources on the footwear; and wherein the flashing circuit is operatively connected to all the light sources to cause the light sources to flash in a selected sequence.

9. The lighting system of claim 8, wherein each light source has a signal terminal for receiving a power signal, and a ground terminal for receiving a ground closing signal from the flashing circuit.

* * * * *